United States Patent Office 2,885,816
Patented May 12, 1959

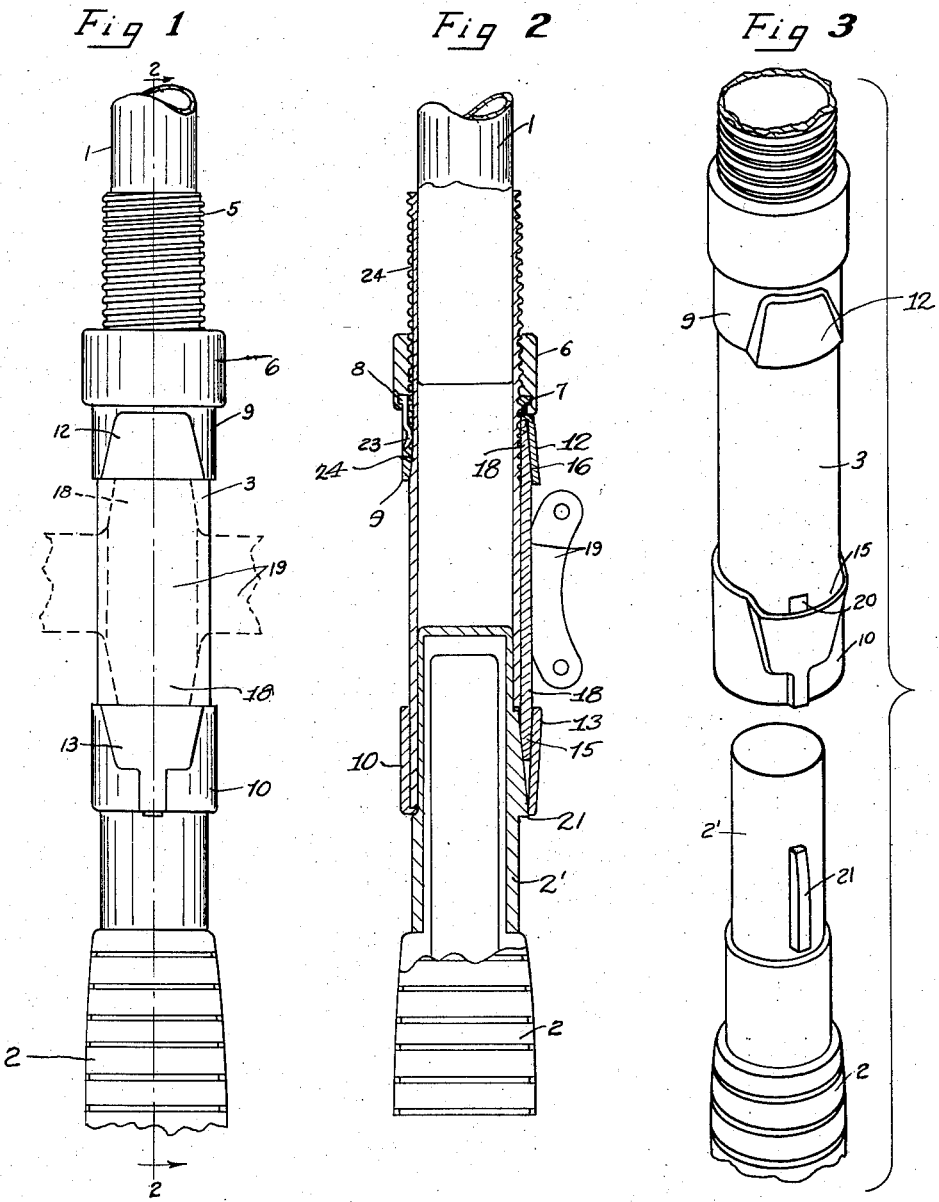

2,885,816

FISHING ROD

Claude J. Cunningham and John J. Labaj, Utica, N.Y., assignors to Horrocks-Ibbotson Company, Oneida, N.Y., a corporation of New York Application December 26, 1952, Serial No. 328,068

3 Claims. (Cl. 43—22)

This invention relates to certain new and useful improvements in fishing rods of the class comprising a pole, a detachable handle, and a fish line reel therefor, and pertains more particularly to a novel connection between the handle, pole, and reel.

The primary object of our invention is to provide a fishing rod of the above-mentioned class with means for securing the pole, handle, and reel together simultaneously, and for releasing these members from each other.

Further objects of the invention reside in providing a clamping structure for simultaneously securing the pole, handle, and reel together which is effective, durable and economical in construction, and which is simple, easy and dependable in operation.

In carrying out the above-mentioned objects, I have provided the pole of a fishing rod with a hollow tubular reel mount body end adapted to receive the forward end of the handle of the rod therein. Spaced-apart clamping elements on the reel mount body are provided with recesses to receive the ends of the reel base therein, one of the clamping elements being fixed to the reel mount body while the other clamping element moves longitudinally of the reel mount body into and out of engagement with the ends of the reel base. Furthermore, the adjacent ends of the handle and reel mount body are provided with a tongue and slot connection which not only maintains these members against relative rotary movement, but are so constructed and arranged that when the handle is properly assembled with the pole one end of the reel base will be wedged against the tongue member by the coaction of the clamping elements and thereby removably secure the reel and handle to the pole and to each other.

The above objects and advantages will be more clearly understood from the following description taken in conjunction with the accompanying drawings in which:

Fig. 1 is a detail side elevation of a fishing rod of my invention showing the reel mount and the pole and handle adjacent thereto, the reel base being indicated by broken lines.

Fig. 2 is a longitudinal sectional view taken substantially in the plane of line 2—2 of Fig. 1.

Fig. 3 is an exploded perspective view of the fishing rod reel mount and the portion of the handle adjacent thereto, constructed as shown in Figs. 1 and 2.

Referring now more specifically to the structure of our invention as shown in the drawings wherein like characters of reference are employed to designate like parts, it will be noted that the numeral 1 designates the butt end portion of a fishing rod, and 2 designates a handle for the pole, constructed in accordance with the invention. Intermediate the rod 1 and the handle 2 is a tubular reel mount body 3 which receives therein the butt end of rod 1 at one end and the reduced forward end 2' of handle 2 at its other end. Rod 1 may be fixedly secured to the reel mount in any well known manner, as by brazing, while handle 2 has a close slip fit in the mount so as to be readily connected to or removed from said mount.

The forward end of body 3 is provided with external screw threads 5 on which is threaded a nut member 6. Nut member 6 has an internal annular groove 7 which rotatably receives an outturned flange or lip 8, formed on one end of collar 9, which extends rearwardly from nut 6 and is slidably mounted on the mount body 3. The other or rear end of reel mount body 3 has a second collar 10, brazed or otherwise secured thereto. Opposed adjacent portions of collars 9 and 10 are provided with bent out portions 12 and 13 respectively, forming longitudinally aligned wedge-shaped recesses 15 and 16 for receiving extended end portions 18 of a conventional reel base 19. In addition to the above, the reel mount body 3 has a slot 20 extending inwardly from its rear end substantially midway between the sides of recess 15 for the reception of a tongue or rib 21 provided on end portion 2' of handle 2. Tongue or rib 21 is of greater thickness than that of the wall of body member 3 so that said tongue or rib extends into recess 15 when handle 2 is assembled with body member 3. Furthermore, rib 21 is inclined longitudinally thereof from its inner end outwardly toward its outer end so as to form a wedge-shaped member which, when positioned in slot 20, coacts with the adjacent end portion 18 of reel base 19 to clamp and lock handle 2, body member 3 and reel base 19 to each other in a rigidly tight, non-rotatable relationship.

In other words, it will now be understood that when it is desired to assemble the reel and handle to the reel mount this may be accomplished in the following simple manner. First the handle 2 may be connected with the reel mount body 3 by inserting end 2' thereof into the body member with rib 21 extending into slot 20. Next collar 9 may be spaced from collar 10 a distance sufficient to permit reel base 19 to be placed on body member 3, if necessary, by backing off nut 6. The reel base 19 is now placed on the reel mount body with the extended end portions 18 thereof aligned with recesses 15 and 16, respectively. Now by rotating nut 6 to advance it and collar 9 toward collar 10, the end portions 18 of the reel base will be caused to move into recesses 15 and 16 until they are firmly seated therein, under which condition the reel base end portion 18 positioned in recess 15 will engage rib 21 and be wedged between said rib and the outer walls of recess 15 causing clamp-like gripping by the body onto the handle and thereby firmly lock handle 2, reel base 19, and the reel mount body 3 to each other.

When it is desired to detach handle 2, reel base 19, and the reel mount from each other, this may be readily accomplished by backing off on nut 6 and collar 9 until the reel base end 18 formerly engaged in recess 16 is released thereby. Reel base 19 is now free to be withdrawn from engagement in recess 15 after which handle 2 may be easily drawn out of engagement with reel mount body member 3.

It will now be clearly understood that the reel, pole, and handle of our novel fishing rod may be locked to or unlocked from each other by simply turning the one nut 6 in the proper direction with respect to threads 5 and therefore body member 3. In order that movable collar 9 will be held against rotation with respect to body member 3 and the relatively fixed collar 10, we have provided collar 9 with a depressed portion forming a key member 23 which rides in an elongated key groove 24 provided in body member 3.

While we have shown and particularly described the preferred embodiment of our invention, we do not wish to be limited to the specific construction shown, as various changes both in the form and relation of the parts thereof may be made without departing from the spirit of the invention, as set forth in the appended claims.

What is claimed is:

1. A fishing rod comprising a pole having a tubular reel mount body fixedly connected thereto to one end thereof, a rod handle, a reel mount base, the other end of said reel mount body having a slot formed therein which extends inwardly from the free end thereof, a tapered rib on said handle, said rib being releasably received in said slot, a first tapered collar adjustably mounted on the one end of said reel mount body and adapted to receive one end of said reel base and a second tapered collar fixedly mounted on the other end of the reel mount body and adapted to receive the other end of the reel base, said first tapered collar being adapted to force said reel base longitudinally of the mount body in such a manner that contact of the other end of the reel base with the second tapered sleeve will cause the same to be forced inwardly into wedging engagement with said rib thereby firmly securing the pole handle and reel together in a rigidly tight non-rotatable relationship.

2. A fishing rod comprising a pole having a tubular reel mount body fixedly connected thereto to one end thereof, a rod handle, a reel mount base, the other end of said reel mount body having a slot formed therein which extends inwardly from the free end thereof, a rib on said handle, said rib being releasably received in said slot, a first tapered collar adjustably mounted on the one end of said reel mount body and adapted to receive one end of said reel base and a second tapered collar fixedly mounted on the other end of the reel mount body and adapted to receive the other end of the reel base, said first tapered collar being adapted to force said reel base longitudinally of the mount body in such a manner that contact of the other end of the reel base with the second tapered sleeve will cause the same to be forced inwardly into wedging engagement with said rib thereby firmly securing the pole handle and reel together in a rigidly tight non-rotatable relationship.

3. A fishing rod comprising a pole having a tubular reel mount body fixedly connected thereto to one end thereof, a rod handle, a reel mount base, the other end of said reel mount body having a slot formed therein which extends inwardly from the free end thereof, a tapered rib on said handle, said rib being releasably received in said slot, a first tapered collar adjustably mounted on the one end of said reel mount body and adapted to receive one end of said reel base and a second tapered collar fixedly mounted on the other end of the reel mount body and adapted to receive the other end of the reel base, said first tapered collar being adapted to force said reel base longitudinally of the mount body in such a manner that contact of the other end of the reel base with the second tapered sleeve will cause the same to be forced inwardly into wedging engagement with said rib thereby firmly securing the pole handle, the rod, and reel together in a rigidly tight non-rotatable relationship.

References Cited in the file of this patent

UNITED STATES PATENTS

| 2,166,407 | Howarth | July 18, 1939 |
| 2,592,878 | Esposito | Apr. 15, 1952 |

FOREIGN PATENTS

| 489,079 | Great Britain | July 19, 1938 |
| 926,448 | France | Oct. 1, 1947 |